Nov. 12, 1929. W. VON NEUDECK 1,735,841
INTERNAL KEY WAY MILLING DEVICE
Filed May 9, 1924 3 Sheets-Sheet 1
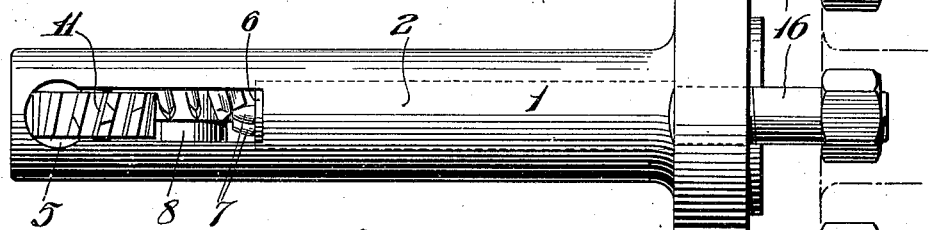
Fig.1.
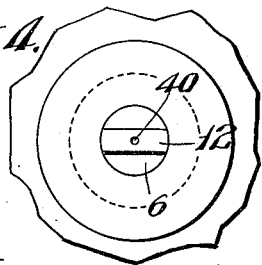
Fig.4.
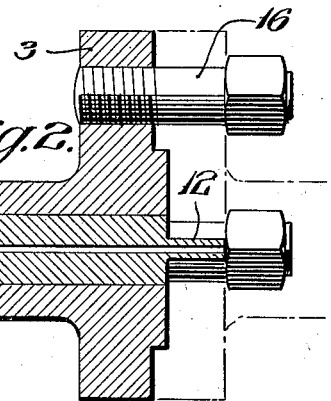
Fig.2.
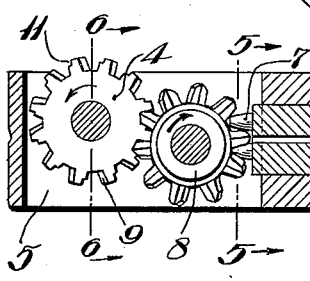
Fig.3.
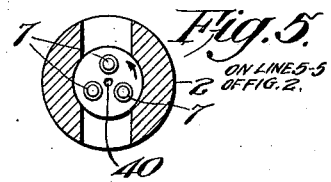
Fig.5.
ON LINE 5-5
OF FIG. 2.
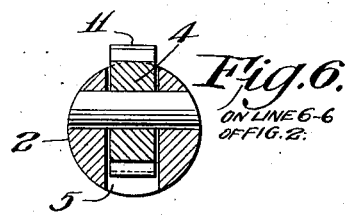
Fig.6.
ON LINE 6-6
OF FIG. 2.
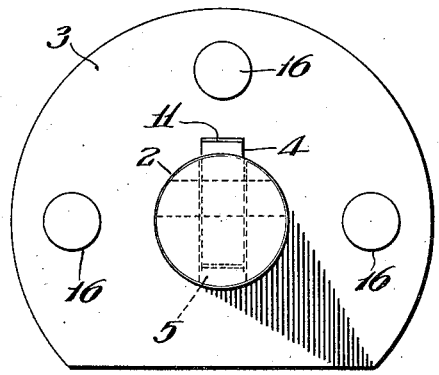
INVENTOR:
Wilhelm von Neudeck,
BY
ATTORNEYS.

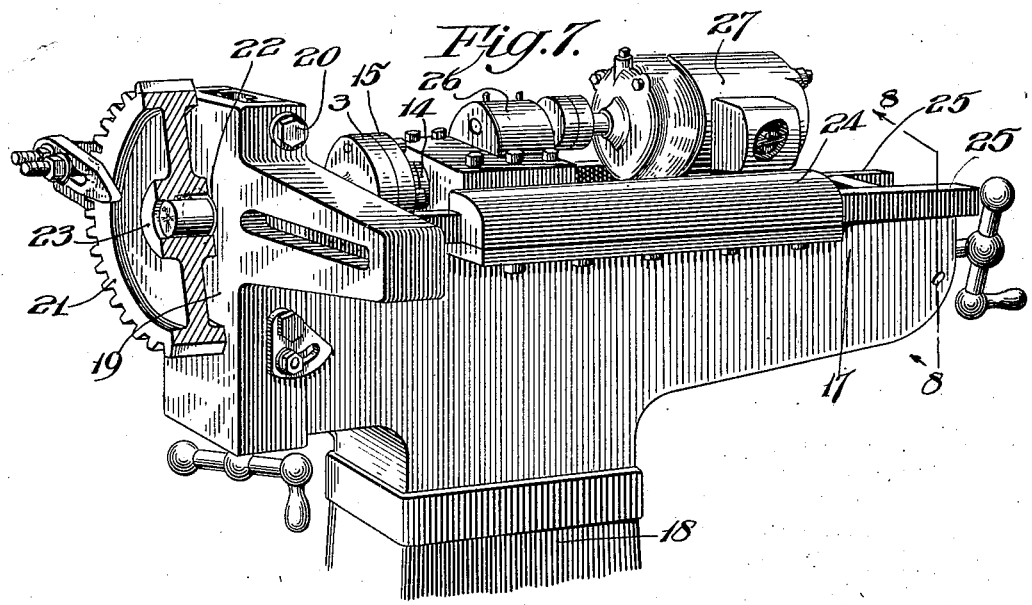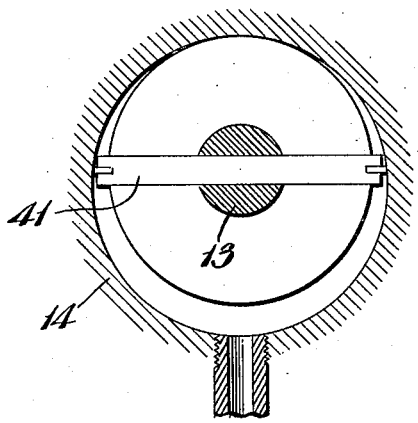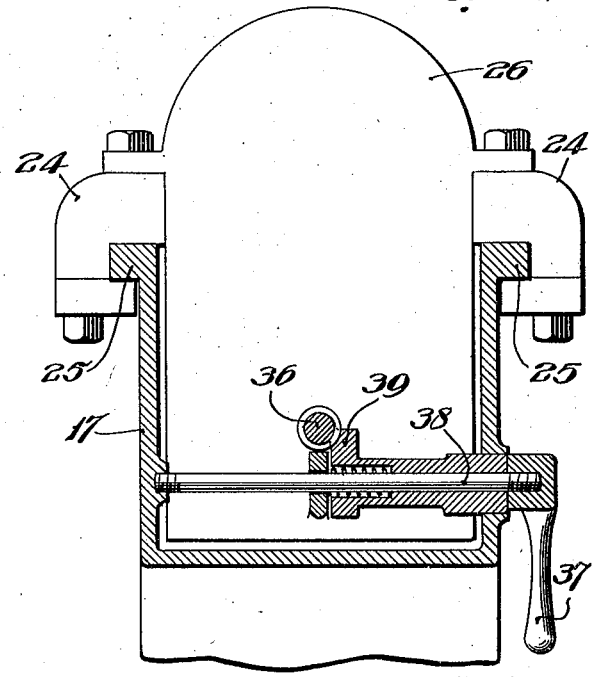

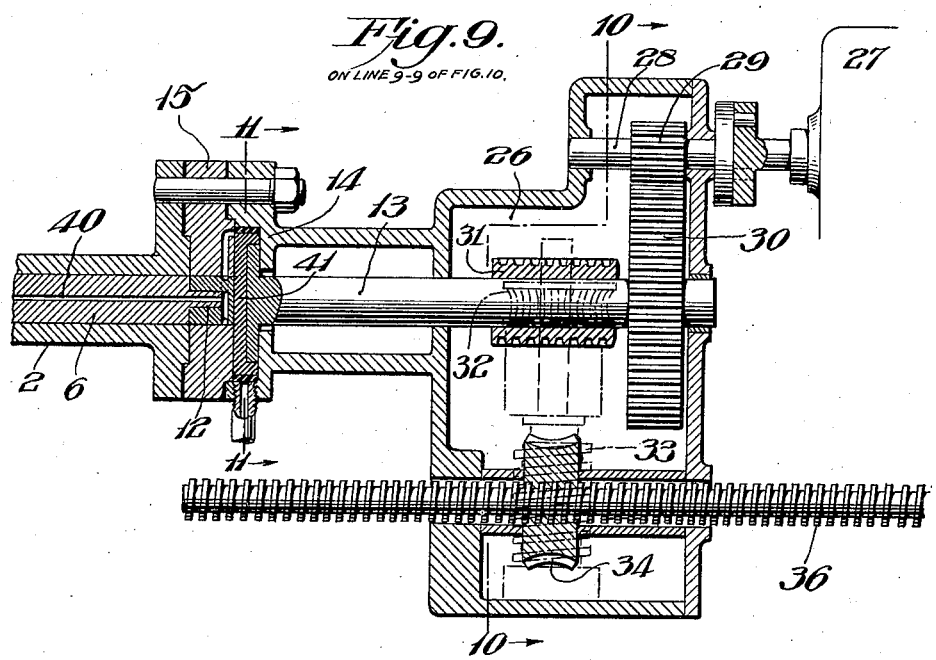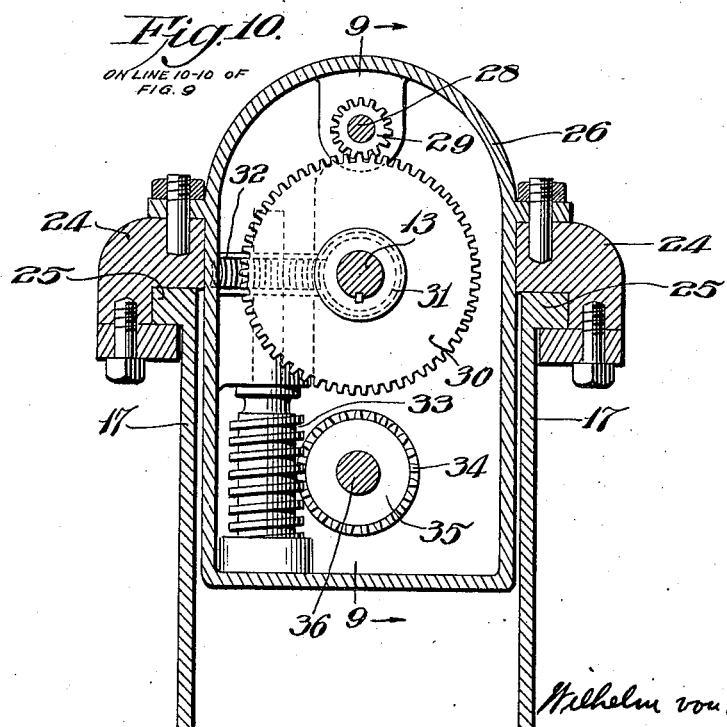

Patented Nov. 12, 1929

1,735,841

UNITED STATES PATENT OFFICE

WILHELM von NEUDECK, OF PHILADELPHIA, PENNSYLVANIA

INTERNAL KEYWAY MILLING DEVICE

Application filed May 9, 1924. Serial No. 712,149.

My invention relates to a novel device adapted to cut internal key ways into the hubs or gears, pulleys, wheels and the like, and it relates more particularly to the type of key way cutting device having a rotary cutter adapted to be guided through the opening in the hub of the gear, pulley or the like, and known as a milling device.

My invention relates chiefly to a novel milling tool and a milling machine adapted to operate said tool and to guide it properly.

With the above ends in view my invention consists of a novel construction in an internal key way milling tool having a tubular shank terminating at one end in a supporting flange, and having a circular milling cutter set into a longitudinal slot at its other end adapted to rotate in a plane parallel to the axis of the shank and having a part of the periphery of said milling cutter, projecting out beyond the cylindrical surface of said shank.

My invention further consists of a novel construction in such an internal key way milling tool, whereby said milling cutter may be rotated by means of a rotary driving shaft having its axis of rotation in the plane of rotation of the cutter, centrally of the cutting edges of said cutter, said shaft being concentric with said shank.

My invention further consists of a novel construction in a milling machine adapted to support, guide, drive and feed said tool, and also adapted to support the article to be milled.

My invention further consists of a novel construction whereby said tool is replaceably secured to said milling machine and whereby tools of various sizes and dimensions may be interchanged on said milling machine.

Lastly my invention consists of a novel construction in said milling machine and tool therefor, whereby the lubricating liquid necessary for the milling operation is supplied to the cutting point without any additional conveying means, and by means of a pump contained within the driving spindle of said milling machine.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a plan view of the novel internal key way milling tool embodying my invention.

Figure 2 represents a section on line 2—2 of Figure 1.

Figure 3 represents a front end view of my novel milling tool.

Figure 4 represents a rear end view of my novel milling tool, showing the flat driving end of the shaft.

Figure 5 represents a section on line 5—5 Figure 2.

Figure 6 represents a section on line 6—6 of Figure 2.

Figure 7 represents a perspective view of my novel milling machine and tool therefor.

Figure 8 represents a section on line 8—8 of Figure 7.

Figure 9 represents a longitudinal vertical section on line 9—9 Figure 10.

Figure 10 represents a transverse vertical section on line 10—10 of Figure 9.

Figure 11 represents a section on line 11—11 of Figure 9.

Similar numerals of reference indicate corresponding parts in the figures.

Referring to the drawings; 1 designates the novel internal key way milling tool of my invention, comprising the tubular shank 2 terminating in a supporting flange 3 at one end and having at the other end the rotary milling cutter 4 supported in the longitudinal slot 5, the driving shaft 6 within the shank 2 and concentric with the same, the face gear 7 at the front end of the driving shaft, and the idle gear 8 operatively interposed between said face gear 7 and the gear teeth 9 of the milling cutter 4.

In the internal key way milling tools known heretofore, it has been the practice to drive the rotary milling cutter directly from a face gear at the end of the driving shaft, by the direct engagement of the pins of the face gear with the teeth of the milling cutter. Due to the fact that the axis of rotation of a face gear must be in alignment with one edge of the coacting gear, the internal key way milling tools known heretofore, have been actuated through a driving shaft which was eccentric with respect to the cutting edges of the milling cutter as well as with respect to the shank of the tool. Due to this eccentricity of the driving shaft, it has been impracticable to construct a key way milling tool of sufficiently small shank diameter for any given width of the milling cutter. That is to say for any given diameter of the shank, or the diameter of the hub opening to which the shank diameter corresponds,—the maximum width of the milling cutter which it is practicable to support in the shank, is not sufficiently wide to meet the standard requirements for a key for the particular diameter opening.

Due to the fact moreover that in said milling tools of prior construction, the eccentricity of the driving shaft varies with the width of the milling cutter, said milling tools are not readily interchangeable; which disadvantage is entirely eliminated by my novel construction to be described more in detail hereinafter.

Accordingly, I interpose the idle gear 8 between the pins 10 of the face gear 7, and the teeth 9 of the milling cutter 4, the cutting edges of which teeth 9 are set back, as shown at 11, so as to permit said teeth to be properly engaged by the teeth of the idle gear 8, thus completing the train of gears between the shaft 6 and the milling cutter 4. The idle gear as will be seen from Figure 1, is approximately one half the width of the milling cutter, thus permitting the engaging edge of the idle gear to be in alignment with the axis of the shaft 6, as well as of the shank 2.

The rear extremity of the shaft 2 is provided with a flat portion 12, adapted to be engaged by a corresponding recess in the end of the spindle 13, of the milling machine, and thereby establish an operative engagement between the spindle of the milling machine and the shaft of the milling tool. The tool is supported on the head 14 of the milling machine, by means of the flange 3 bolted to a corresponding flange 15 on the head 14 of the milling machine, by means of the bolts 16.

As shown in Figure 7, the internal key way milling machine of my novel construction consists chiefly of a bed 17 supported on a base 18 and having a vertically slidable table 19 pivotally supported at one end on the pivot 20. Onto this table 19 is secured the article which is to be provided with a key way, as shown for example by the gear wheel 21, broken away partly to expose to view the shank 2 of the milling tool 1, which extends through an opening 22 in the table 19, into the opening of the hub 23 of the gear wheel 21. The carriage 24 slidably mounted on the guides 25 of the bed 17 carries the gear box 26, the head 14, as well as the source of power such as a pulley or the electric motor 27, as illustrated in the drawings.

The gear box 26 serves to transmit the driving power from the receiving shaft 28 to the spindle 13, through the gears 29 and 30 accompanied by the proper change in speed. The gear box 26 also contains a train of worm gears 31, 32, 33 and 34 adapted to effect a continuous feeding of the carriage 24 and hence the tool 1 towards the table 19. This is accomplished by the rotation of the internally threaded collar 35 by the train of worm gears (31, 32, 33, and 34). The feed screw 36 passing through the collar 35 is normally free to rotate but is held in the bed 17 against any longitudinal displacement. When it is desired to feed forward in the direction of the table 19, the carriage 24 and hence the milling tool 1, the handle 37 threadedly engaging the stationary screw 38 is turned so as to force the clamp 39 against the periphery of a blank portion of the feed screw 36, thereby preventing any rotation of the same, and thus causing the carriage to be moved forward in the direction of the table 19.

For the purpose of efficient and positive lubrication of the milling cutter, I provide a novel construction in a rotary lubricating pump and fluid conveying means, for the lubricating liquid, whereby the said lubricating fluid will be conveyed to the cutting point, through an opening 40 extending longitudinally through the shaft 6 of the milling tool, without any additional pipe line, and forced through said opening 40 and onto the cutter by a rotary pump 41, contained in the head 14 and forming part of the spindle 13 of the milling machine, as illustrated in Figures 9 and 11.

It will now be apparent that I have devised a novel and useful internal key way milling device which embodies the features of advantage enumerated as desirable in the statement of the invention and the above description, and while I have, in the present instance shown and described a preferred embodiment thereof which will give satisfactory and reliable results, it is to be understood that such embodiment is susceptible of modification in various particulars without departing from the spirit or scope of the invention or sacrificing any of its advantages.

Having thus described my invention what I claim as new and desire to secure, by Letters Patent, is:—

1. In an internal key way milling device, an elongated housing, a toothed rotary milling cutter rotatably mounted near one end of said housing, a driving shaft extending longitudinally of said housing and having its axis substantially in the central plane of rotation of said cutter, a face gear on the end of said driving shaft nearest said cutter, and an idle toothed wheel operatively interposed between said face gear and cutter and engaging the respective teeth of the same.

2. In an internal key way milling device, a tubular shank, a coaxial driving shaft extending through said shank, a toothed rotary cutter rotatably mounted in one end of said shank, with its plane of rotation substantially parallel to the axis of said shaft, a face gear on the end of said driving shaft nearest said cutter, and an idle gear wheel operatively interposed between said face gear and said rotary cutter respectively, said idle gear being approximately one-half the width of said cutter.

3. In an internal key way milling device, a tubular shank terminating in a supporting flange at one end, and having a longitudinal slot extending transversely of said shank at its other end, a toothed rotary cutter rotatably mounted in said slot with its plane of rotation parallel to the axis of said shank, a coaxial driving shaft extending through said shank, a face gear on the end of said shank nearest said cutter, and an idle gear wheel operatively interposed between said face gear and said cutter and engaging the respective teeth of the same.

4. In an internal key way milling device, a housing, a vertically slidable table at one end of said housing, horizontal ways on said housing, a carriage adapted to travel on said ways, at a right angle to said table, a tool supporting head carried by said carriage and adapted to support a milling tool, a spindle within said head adapted to actuate said tool, a rotary fluid pump within said head and forming part of said spindle, and an opening through said spindle adapted to convey a lubricating fluid from said pump to said tool.

5. In an internal key way milling device, a housing, a normally vertical table at one end of said housing, slidable in a substantially vertical direction and fulcrumed so as to be capable of being inclined at an angle to the normal vertical position, horizontal ways on said housing, a carriage adapted to travel on said ways at substantially a right angle to said table, a tool supporting head carried by said carriage and adapted to support a milling tool, a spindle within said head adapted to actuate said tool, means adapted to feed said carriage towards said table, means adapted to actuate said spindle, means intermediate said spindle and said carriage feeding means, to actuate the latter, a rotary fluid pump within said head and forming part of said spindle, and an opening through said spindle adapted to convey a lubricating fluid from said pump to said tool.

6. In an internal key way milling device, a spindle, means to actuate said spindle, a housing surrounding and supporting said spindle, adapted to travel forward in a horizontal direction and having means thereon adapted to support a milling tool, an elongated tool housing secured to said tool supporting means at one end thereof, a rotary cutter near the other end of said tool housing, a driving shaft within said housing operatively engaged by said spindle and adapted to actuate said rotary cutter, a rotary fluid pump within said housing and forming part of said spindle, and a passageway extending through said spindle and said driving shaft adapted to convey a lubricating fluid from said pump to said rotary cutter.

7. In a device of the character stated, an elongated tubular housing, a toothed cutter rotatably mounted in said housing longitudinally thereof, a driving shaft extending longitudinally through said housing, a face gear on the end of said driving shaft nearest said cutter, and an idle toothed wheel of less width than said cutter operatively interposed between said face gear and said cutter, and having its central plane of rotation offset from the axis of said driving shaft.

8. In an internal key-way milling device, an elongated housing, a toothed rotary milling cutter rotatably mounted near one end of said housing, a driving shaft extending longitudinally of said housing and having its axis substantially in the central plane of rotation of said cutter, a face gear on the end of said driving shaft nearest said cutter, and an idle toothed wheel operatively interposed between said face gear and cutter and engaging the respective teeth of the same, having its central plane of rotation offset from the axis of said driving shaft.

9. In an internal key-way milling device, a tubular shank, a coaxial driving shaft extending through said shank, a toothed rotary cutter rotatably mounted in one end of said shank, with its plane of rotation substantially parallel to the axis of said shaft, a face gear on the end of said driving shaft nearest said cutter, and an idle gear wheel of less width than said cutter operatively interposed between said face gear and said rotary cutter respectively, having its central plane of rotation offset from the axis of said driving shaft.

10. In an internal key-way milling device, a tubular shank terminating in a supporting flange at one end, and having a longitudinal slot extending transversely of said shank at its other end, a toothed rotary cutter rotatably mounted in said slot with its plane of rotation parallel to the axis of said shank, a coaxial driving shaft extending through said shank, a face gear on the end of said shank nearest said cutter, and an idle gear wheel operatively interposed between said face gear and said cutter and engaging the respective teeth of the same, having its central plane of rotation offset from the axis of said driving shaft.

11. In a device of the character stated, an elongated tubular housing, a toothed cutter rotatably mounted in said housing and disposed centrally with respect thereto, a driving shaft extending longitudinally of said housing, and having a face gear on the end thereof nearest said cutter, and an idle toothed wheel of less width than said cutter operatively interposed between said face gear and said cutter.

12. In a device of the character stated, an elongated tubular housing, a coaxial driving shaft extending through said housing, a toothed cutter rotatably mounted in said housing and disposed longitudinally and substantially centrally thereof, a face gear on the end of said driving shaft nearest to said cutter, and an idle gear of less width than said cutter operatively interposed between said face gear and said cutter.

13. In a device of the character stated, an elongated tubular housing, a coaxial driving shaft extending therethrough, a toothed cutter rotatably mounted in said housing near one end thereof, and disposed longitudinally and generally centrally of said housing, a face gear on one end of said driving shaft nearest said cutter, and an idle gear wheel of less width than said cutter operatively interposed between said face gear and said cutter having its central plane of rotation offset from the axis of said driving shaft.

14. In a device of the character stated, an elongated tubular housing, a toothed cutter rotatably mounted in said housing, longitudinally thereof, a driving shaft extending longitudinally through said housing, a face gear on the end of said driving shaft nearest said cutter, and an idle toothed wheel of less width than said cutter operatively interposed between said face gear and said cutter; said driving shaft having a lubricant passageway therein, terminating in the end thereof nearest said cutter.

15. An internal key-way milling machine, comprising a tool support and a work support, one of said two supports being slidably mounted with respect to the other, parallel to the axis of the tool support, an axial spindle in said tool support, an elongated tubular tool housing carried by said tool support and projecting therefrom, a toothed cutter rotatably mounted in said tool housing, near the free end thereof, a coaxial driving shaft extending through said housing, having one end thereof operatively engaged by said spindle, and means of less width than said cutter intermediate the other end thereof and said cutter, operatively to connect the same.

16. An internal key-way milling machine, comprising a tool support and a work support, one of said two supports being slidably mounted with respect to the other, parallel to the axis of the tool support, an axial spindle in said tool support, an elongated tubular tool housing carried by said tool support and projecting therefrom, a toothed cutter rotatably mounted in said tool housing, near the free end thereof, a coaxial driving shaft extending through said housing, having one end thereof operatively engaged by said spindle, and an idle gear of less width than said cutter intermediate of the other end of said driving shaft and said cutter operatively connecting the same.

17. An internal key-way milling machine, comprising a tool support and a work support, one of said two supports being slidably mounted with respect to the other, parallel to the axis of the tool support, an axial spindle in said tool support, an elongated tubular tool housing carried by said tool support and projecting therefrom, a toothed cutter rotatably mounted in said tool housing, near the free end thereof, a coaxial driving shaft extending through said housing, having one end thereof operatively engaged by said spindle, a face gear carried by the other end of said driving shaft, and an idle gear of less width than said cutter operatively interposed between said face gear and said cutter.

18. An internal key-way milling machine, comprising a tool support and a work support, one of said two supports being slidably mounted with respect to the other, parallel to the axis of the tool support, an axial spindle in said tool support, an elongated tubular tool housing carried by said tool support and projecting therefrom, a toothed cutter rotatably mounted in said tool housing, near the free end thereof, a coaxial driving shaft extending through said housing, having one end thereof operatively engaged by said spindle, and a lubricant passageway in said driving shaft terminating in the outer end thereof, in combination with a rotary pump carried by said spindle for forcing lubricant into said passageway.

19. An internal key-way milling machine, comprising a tool support and a work support, one of said two supports being slidably mounted with respect to the other, parallel to the axis of the tool support, an axial spindle in said tool support, an elongated tubular tool housing carried by said tool support and projecting therefrom, a toothed cutter rotatably mounted in said tool housing, near the free end thereof, a coaxial driving shaft extending through said housing, having one end thereof operatively engaged by said spindle, a rotary pump carried by said spindle and a fluid passageway communicating with said pump extending through said driving shaft and terminating in the end thereof nearest said cutter.

20. An internal key-way milling machine, comprising a tool support and a work support, one of said two supports being slidably mounted with respect to the other, parallel to the axis of the tool support, an elongated tool housing carried rigidly by said tool support, and projecting therefrom, a toothed cutter rotatably mounted in the free end of said tool housing, a driving spindle in said tool support, and means of less width than said cutter extending through said elongated tool housing and operatively connecting said driving spindle with said rotary cutter.

21. In a device of the character stated, a tool support and a work support, one of said two supports being slidably mounted with respect to the other, an elongated tool housing detachably and rigidly secured to said tool support and projecting therefrom, into operative relation to said work support, a toothed cutter rotatably mounted in the free end of said tool housing, and disposed longitudinally thereof, a driving spindle in said tool support and means of less width than said cutter contained within and extending through said tool housing operatively connecting said toothed cutter with said driving spindle, and means to effect a relative movement of said two supports in timed relation to said driving spindle.

WILHELM von NEUDECK.